April 14, 1964
A. S. PARKS
3,128,784
WIDE RANGE LIQUID LEVEL CONTROL DEVICES
Filed Aug. 4, 1961
2 Sheets-Sheet 1
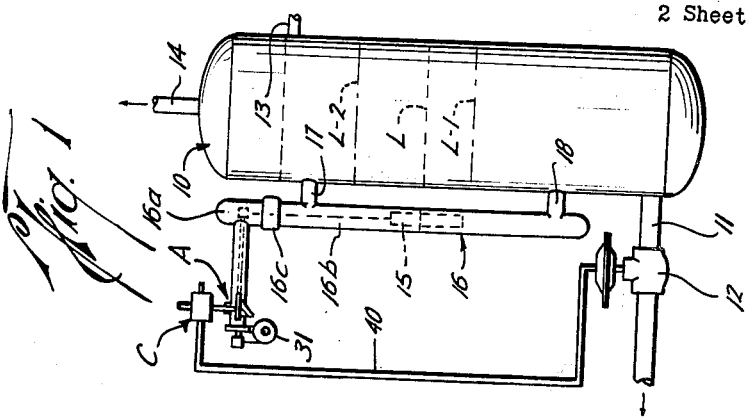
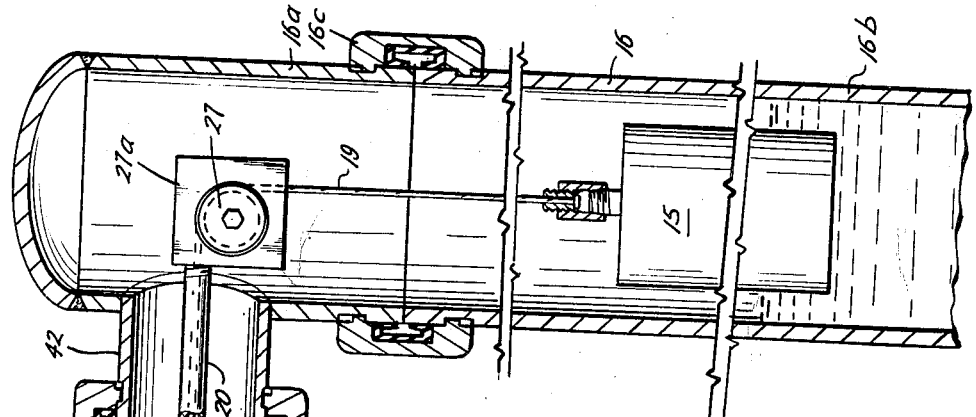
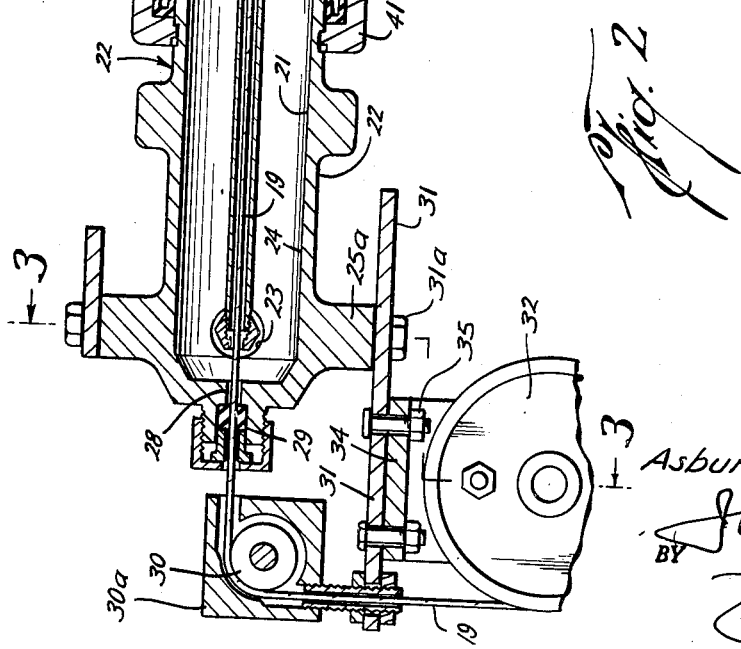
Asbury S. Parks
INVENTOR.
BY Vincent Martin
Jos. E. Edwards
M. H. Gay
ATTORNEYS

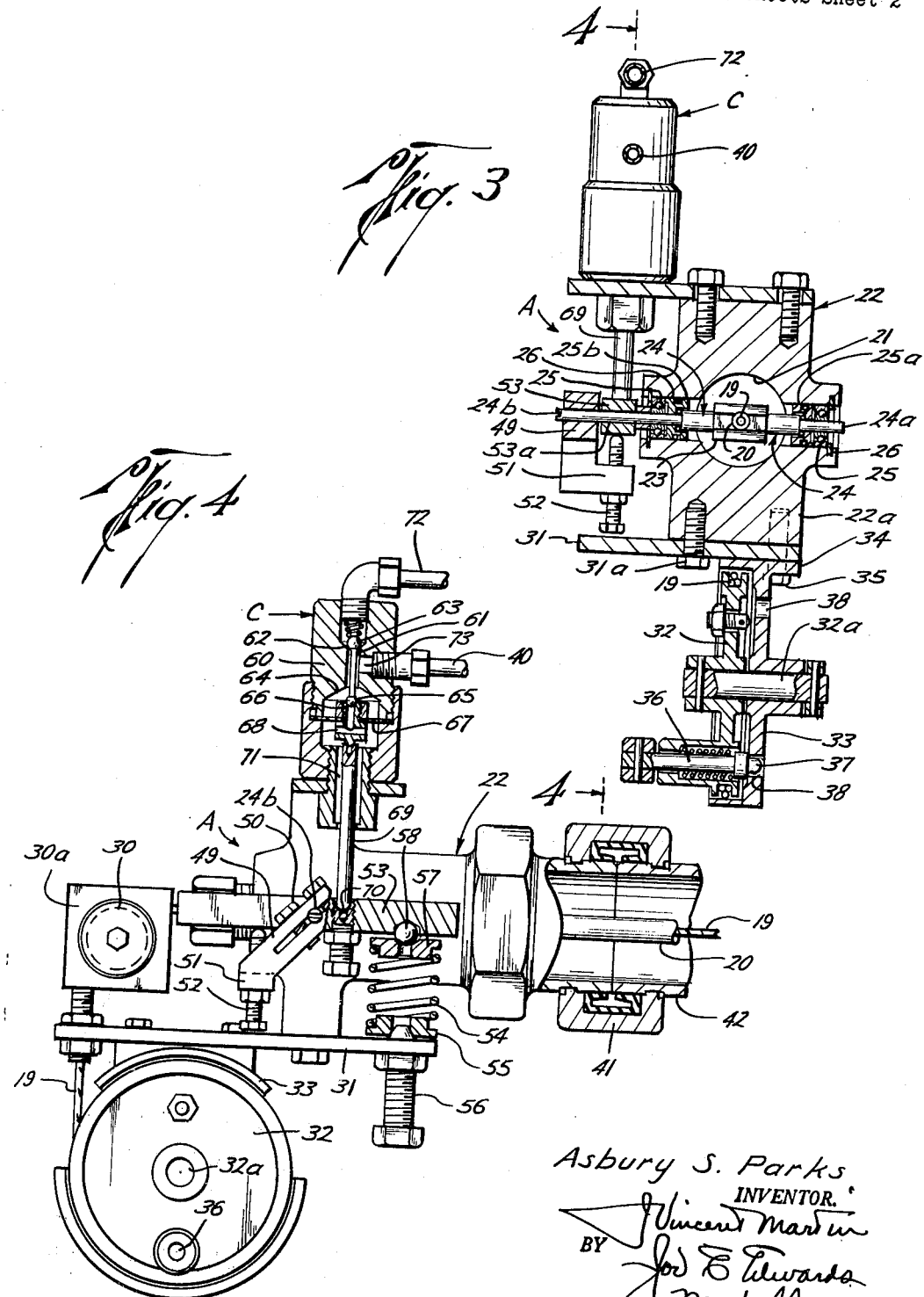

United States Patent Office 3,128,784
Patented Apr. 14, 1964

3,128,784
WIDE RANGE LIQUID LEVEL CONTROL DEVICES
Asbury S. Parks, Houston, Tex., assignor to Dover Corporation, Tulsa, Okla., a corporation of Delaware
Filed Aug. 4, 1961, Ser. No. 129,480
15 Claims. (Cl. 137—172)

This invention relates to new and useful improvements in wide range liquid level control devices.

In controlling the level of a liquid within a vessel or tank, it is desirable that the control element be adjustable to various elevations so that the liquid level may be changed to meet different conditions. Prior devices have not provided a simple and readily accessible means for changing the position of the control element of a liquid level control device over a relatively wide range to thereby change the point at which the liquid level is maintained. Any adjustments of the control element in past devices have been quite limited.

In the control of the level within a vessel or tank, it is desirable that the control float be adjustable to various elevations since changing circumstances may require the maintenance of different levels at various times.

In addition to controlling the level of a single liquid within a vessel, liquid level control devices are also used in controlling the interface between two immiscible liquids such as oil and water, and this presents more of a problem because the control element of the device is acted upon by both liquids. For controlling the interface between two liquids in a single vessel, two general types of control devices have been in common use.

One type of interface control utilizes a pressure sensing device, such as a diaphragm or bellows, which is responsive to the pressure at a point below the top of a column consisting of the two liquids; this type is capable of being adjusted to vary the level of the interface as desired and so long as there is no change in the density of the liquids comprising the column, operates satisfactorily. However, any change in density of either one or both liquids affects the control so that the desired interface point is not maintained.

The second type of control which is in use employs the well-known float suspended in the interface. Such float control is not affected by changes in the density of the liquids and is satisfactory so long as the range of adjustment of the interface point does not exceed the length of the float. However, where a relatively wide range of adjustment of the interface is required, it is impractical to employ an extremely long float member and for this reason the usual float control for controlling the interface between two liquids has definite practical limitations.

Many applications, particularly in the oil and gas industry, involve control of the interface of two liquids, the densities of which change from time to time and also involve varying the control point of said interface over a wide range in the order of ten or twelve feet. One specific example of an apparatus which handles liquids of varying densities and which requires adjustment of the interface over a wide range is the so-called "emulsion treater" commonly used in the oil fields for separating oil from water as produced from a well. When both conditions, that is liquids of varying densities and necessity for wide range of control of interface, are present, the usual control devices of either the pressure-sensitive type or the float type have specific practical limitations.

An important object of this invention is to provide an improved liquid level control device which may be used not only to control the level of a single liquid within a vessel but which also may be effectively employed for controlling the interface between two immiscible liquids, the densities of which vary from time to time; the adjustability of the control element over a wide range making it possible to properly control the point of the interface between said liquids in accordance with operating conditions of the particular vessel to which it is applied.

Another object is to provide a liquid level control device which includes a float element together with means for physically moving the float element to adjust its position with respect to the vessel over a wide range, whereby the change in the control point of the liquid level being controlled is not restricted or limited by the physical size of the float element.

Another object is to provide a liquid level control device of the character described, wherein the adjustment of the float element may be accomplished from the exterior of the liquid-containing vessel or area in which the float element operates and without halting the operation of the vessel or apparatus to which the control device is applied.

A further object is to provide a liquid level control device of the character described, wherein the float element has connection with a control unit which is responsive to the float operation; said connection being such that the adjustment of the float element to different elevations which changes the control point of the interface, does not affect the efficient and proper operation of said control unit.

A particular object is to provide an improved suspension arrangement of the float element from a movable float arm, whereby changes or adjustment of the float element are made relative to said float arm and without in any manner interfering with normal operation of said arm and its associated mechanism.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is an elevation of a liquid level control device constructed in accordance with the invention, and illustrating the same mounted on an emulsion treater vessel.

FIGURE 2 is an enlarged sectional detail of the liquid level control device and particularly showing the mounting of the float element.

FIGURE 3 is a transverse, vertical sectional view, taken on the line 3—3 of FIGURE 2, and FIGURE 4 is a view, partly in section and partly in elevation, and taken along the line 4—4 of FIGURE 3.

The invention will be described herein as controlling the interface between two liquids within a vessel but it is to be understood that it may be employed for maintaining the desired level of a single liquid contained in a vessel or tank. In either case it will properly control liquid level, the control point of which may be varied over a wide range.

In the drawings (FIGURE 1), the numeral 10 designates a vessel which will be assumed to contain two immiscible liquids, the interface of which is to be maintained at a desired level as indicated at L. Assuming the vessel 10 to schematically illustrate the well-known oil field emulsion treater, said vessel will contain oil, water and gas as produced from a well. The water is conducted from the vessel through a discharge line 11 under the control of a pressure-actuated valve 12, while the oil escapes from the vessel through an oil outlet conductor 13 which is normally disposed nearer the upper end of the vessel; the gas escapes from the vessel through a gas outlet pipe 14 extending upwardly from the top thereof. Whenever the interface level L rises above the desired elevation, the valve 12 either opens or moves to a more open position to permit such discharge of water from the vessel as is necessary to lower said interface. Conversely, a drop in the interface level moves the valve toward closed position to restrict the discharge sufficiently to return the level to the desired point. By controlling the level L of the interface between the liquids within a predetermined range, proper treater operation is obtained.

For controlling the operation of the discharge valve 12 to thereby control or maintain the interface at the proper level L a float element 15 is provided. This float element is a displacement type float which does not float upon the upper surface of the liquid in the manner of a hollow fully buoyant type but rather is weighted and may be partially or wholly submerged. As liquid rises and falls relative to a displacement type float, the float member, in effect, loses or gains weight in accordance with the level of liquid relative thereto and this variation in effective weight of the float member is proportional to liquid level. The float element 15 may, if desired, be disposed in the interior of the particular vessel 10 but it is preferable to mount said float for movement within a vertical pipe or chamber 16 which has its lower end communicating through a short nipple 17 with the interior of the vessel at some point well below the water level L. The upper end of said pipe 16 is in communication through a second nipple 18 with the interior of the vessel 10 at a point below the upper level of the oil. Being in communication with the vessel interior the liquids from the vessel may pass into the pipe or chamber 16 and the float element is responsive to a rise and fall of the interface level L. For convenience of assembly, the pipe or chamber 16 is constructed of an upper section 16a and a lower section 16b, which sections are suitably connected by a coupling 16c.

In the preferred embodiment illustrated, the float element 15 (FIGURE 2) is suspended by means of a cable 19 from the outer end of a float support arm or tube 20. The tubular arm 20 is axially disposed within the bore 21 of a housing or body 22 and has one end secured to a transverse pivot block 23. Said pivot block has a pivot shaft 24 (FIGURE 3), the ends of which are rotatable in bearings 25 mounted within transversely aligned openings 26 in said housing and thus the tubular support arm 20 is mounted for pivotal movement. The free end of the arm projects into the upper end of the pipe or chamber 16 and preferably has a carrier block 27a within which is mounted a pulley or roller 27.

One end of the cable 19 is secured to the float element 15 and said cable passes over the pulley 27, then through the bore of the tubular support arm 20 and finally extends outwardly to the exterior of the housing through an opening 28 in the end of the housing. A suitable packing gland assembly 29 seals off around the cable within the opening 28 and prevents escape of pressure while allowing movement of the cable therethrough.

That end of the cable projecting from the housing passes over an external roller or pulley 30 which is mounted in a suitable supporting block 30a; the block 30a is carried by a horizontal bracket plate 31 which is secured by a suitable bolt 31a to a boss or projection 25a depending from and formed integral with the main housing 22. After passing around the roller 30, the free end of the cable 19 is wound upon a rotatable reel 32 (FIGURE 3). The reel is supported upon a shaft 32a which is journaled within the central portion of a fixed circular support disk 33; said circular disk has its upper end flanged as shown at 34 and is fastened by bolts 35 to the underside of the bracket plate 31.

For latching or locking the reel 32 in various rotatable positions with respect to the fixed support disk 33, said reel has a spring-pressed pawl 36 carried thereby and the end 37 of said pawl is engageable in one of several openings 38 formed in the disk 33. The openings 38 are arranged in a circumferential or annular path and any desired number of such openings may be provided. With this arrangement, the reel 32 may be rotated to wind or unwind the cable 19 therefrom and by means of the spring pressed pawl may be latched in various adjusted positions with respect to the support disk 33. Whenever the reel is rotated in a direction to unwind cable, the float element 15 will be lowered within its pipe 16; conversely, when the reel is rotated in a direction to wind the cable 19 thereon, the float element 15 is raised within the pipe to a higher elevation. The reel 32 provides a simple mechanism, located exteriorly of the vessel or chamber in which the float element 15 is disposed for moving the float element to desired elevations whereby proper control of liquid level by said float may be accomplished. Because the cable may be of any length, it is obvious that the float element 15 may be adjusted over a very wide range of many feet and the adjustment may be effected from externally of the vessel or chamber in which the float operates and without interfering with the normal operation of such vessel.

Referring to FIGURE 1, the float element 15 is preferably positioned so that its midpoint is substantially opposite or in horizontal alignment with the level L at which the interface is to be controlled. By so locating the float, any small changes in the interface level by reason of changes in liquid densities will not render the float inactive for control purposes. As will be explained, the gain or loss in weight of the float element by reason of the liquid level rising or falling with respect thereto is utilized to actuate a control assembly, generally indicated at A, and such control assembly has connection through a pilot pressure line 40 with the pressure-controlled water discharge valve 12. If the level L of the interface falls, the assembly A is actuated to control the pilot pressure in a direction to move the discharge valve toward closed position and thereby allow the interface level L to rise within the vessel. If the interface level rises so that there is a change in the effective weight of the float element, the assembly A is again actuated to control pilot pressure in a direction which moves the water discharge valve 12 toward an open position, allowing more water to flow from the vessel 10 to thereby lower the level.

If it is necessary, due to excessive change in the density of one or both liquids or for other reasons, to change the control point of the interface level, the reel 32 is rotated to vary the position of the float element relative to the support arm 20. For example, if it is desired to carry the interface at the level L-1, the reel 32 is rotated in a direction to lower the float element 15 from the position shown in FIGURE 1 and to lock the float element at the new control point position. Thereafter the float element will function to hold the interface at the new level L-1.

If it is necessary or desirable to raise the interface level to the point L-2 indicated in FIGURE 1, the cable reel is rotated in a direction to raise the float element to the level L-2 and thereafter the float element will function to hold the interface at that level. By mounting the float element for adjustment vertically independently of the float support arm 20, the float may be adjusted over a very wide range with respect to the vessel 10. The adjustment may be made from externally of the vessel and without in any way interfering with the normal operation of said vessel.

Various types of control assemblies A which will be responsive to the gain or loss of weight of the float element by reason of rise or fall of liquid level may be employed but one type of assembly which has been found satisfactory is illustrated in FIGURES 3 and 4. The assembly illustrated is similar in operation to the control assembly illustrated in my copending application Serial No. 658,745, filed May 13, 1957, now Patent No.

3,064,474, issued Nov. 20, 1962. Briefly, the assembly includes the main housing 22 which is connected through a suitable coupling 41 with a nipple 42 projecting outwardly from the upper end of the float receiving chamber or pipe 16. If the float is mounted directly in the vessel the tubular nipple 42 would of course extend from the vessel itself.

As has been noted, the free end of the tubular support arm 20 carries the pulley or roller 27. The other end of the support arm is secured within the pivot block 23 which extends transversely of the bore 21 of the main housing 22 (FIGURE 3). One end 24a of the pivot shaft 24 has an annular seal 25a surrounding the same adjacent the bearing 25 while the opposite end 24b of said shaft is surrounded by a similar seal 25b which is adjacent the opposite bearing 25. The projecting end 24b of the shaft 24 has a bracket arm 49 clamped thereto by suitable clamping bolts 50. The lower end of this bracket arm has an extension 51 provided with an adjusting screw 52 which is threaded through said extension. The upper end of the adjusting screw 52 engages the underside of an actuator bar or lever 53, which bar is disposed between the bracket arm 49 and the side of the housing 22 (FIGURE 3).

The actuator bar or lever 53 has a transverse opening 53a through which the projecting end 24a of the shaft 24 extends whereby the actuator bar is freely rotatable or pivotally mounted upon said shaft. The adjusting screw 52 carried by the bracket arm 49 engages the underside of said actuator bar on one side of the shaft 24 while the opposite end of the actuator bar 53 overlies a coiled spring 54 which has its lower end supported upon a bearing member 55 (FIGURE 4). The bearing member 55 is, in turn, supported upon an adjusting screw 56 which is threaded through the horizontal supporting plate bracket 31. It is preferable that an upper bearing member 57 and a ball member 58 be interposed between the upper end of the spring and the under side of the actuator bar in order to reduce friction.

With the foregoing arrangement, the float element 15 is suspended from the tubular float support tube or arm 20 and said arm is fastened through the pivot block 23 to the rotatable shaft 24 upon which the bracket arm 49 is clamped. The bracket arm carries the adjusting screw 52 which has its upper end engaging the underside of the actuator bar or lever 53 on one side of said shaft. The under side of the actuator bar, at the end opposite the point of engagement of the screw 52, is constantly urged upwardly by the spring 54. By compressing the spring 54 an upward force is exerted upon one end of the lever and this upward force is converted into a downward force at the opposite end of the actuator lever or bar by reason of said bar being pivoted about the shaft projection 24a. This downward force is applied to the adjusting screw 52 and through the bracket arm 49 is transmitted to the shaft and therefore to the float support arm 20. By properly adjusting the compression of spring 54, it is possible to balance the weight of the float element 15 and with the float element exactly in balance, the slightest change of liquid level with respect to the float element will result in the float element either gaining or losing effective weight and upsetting the balanced condition. This upset of the balanced condition as caused by the liquid will cause a movement of the actuator bar or lever 53. As the float element attempts to move upwardly by reason of liquid rising therearound, a torque is applied to the pivot block 23 which tends to impart rotation to the shaft end 24a; such rotation will reduce the force acting against the under side of the lever through the screw 52. However, since the spring 54 is exerting a constant force against the under side of the opposite end of the lever or bar 53, said bar will be urged in a direction tending to move that end of the bar which overlies the spring in an upward direction. This upward movement as effected by the spring actuates a pilot pressure control unit generally indicated at C to direct pilot pressure through the conductor 40 to the pressure-responsive element of the water discharge valve 12. Any reverse torque on the support arm mounting will urge the actuator bar in an opposite direction, thereby resulting in actuation of the pilot pressure control in a direction to vent pressure from the conductor 40.

Although any known pilot pressure control unit may be employed, the unit illustrated in FIGURES 3 and 4 has been found satisfactory. Such unit includes a housing 60 having a central or axial bore 61 therein. An upper valve seat 62 is formed in the bore and is engageable by an upper valve member 63. The valve member 63 has a depending valve stem 64 to which is attached a lower valve member 65. The lower valve member is engageable with the valve seat 66 of a diaphragm assembly 67 mounted in the lower portion of the housing 60. The diaphragm assembly 67 is provided with vent ports 68 and the lower end of said assembly engages an actuator rod 69. The actuator rod 69 extends downwardly with its lower end engaged within a recess 70 in the upper end of the actuator bar or lever 53, such engagement being on the same side of the shaft 46 as that on which the spring 54 acts. There is an annular vent space 71 provided around the rod 69 so that when the lower valve 65 is unseated or disengaged from the seat 66 any pressure within the pilot unit housing may be vented through the vent ports 68 and said annular space 71 which, of source, communicates with atmosphere.

A pilot pressure supply line 72 is connected into the upper end of the pilot unit housing 60 while the conductor 40 extending to the water discharge valve 12 is connected into a lateral port 73 which is located between the valve seats 62 and 66.

In the operation of the pilot pressure control unit C, any upward movement of rod 69 caused by swinging of the actuator bar or lever 53 will result in an unseating of the upper valve 63 whereby pilot pressure may be directed to conductor 40. Swinging of the actuator bar 53 in an opposite direction which allows downward motion of the actuator rod 69 will move the diaphragm assembly 67 which carries the valve seat 66 downwardly and unseat the lower valve 65; such unseating of the lower valve occurs after the upper valve 63 has been reseated and pressure from conductor 40 is vented to atmosphere through the vent ports 68 and the annular space 71. It is thus evident that the particular motion of the actuator bar or lever 53 controls the positions of the valves 63 and 65 to either introduce additional pilot pressure to conductor 40 or to vent pilot pressure therefrom. The pilot pressure supply line 72 may have a suitable regulator (not shown) connected therein to properly control the pressure of the pilot pressure fluid. As has been noted, the particular control unit C shown in FIGURES 3 and 4 has been found satisfactory but other types of control units may be employed in combination wtih the particular float element 15 and its suspension by means of the cable 19.

Although it is preferable to mount the float element 15 within the separate pipe or chamber 16 which may be readily connected to a particular vessel 10 in which the interface between two liquids is to be controlled, it is not necessary that said pipe be provided. If the internal structure of a particular vessel 10 permits, the float element 15 may be mounted directly in the interior thereof.

In summarizing the operation, the float element is suspended from the cable 19 which passes over the pulley 27 and then passes through the tubular float support arm 20, which, as has been noted, is suspended from the rotatable pivot block 23. The end of the cable passes outwardly through the packing gland 29 which suitably seals around said cable to prevent escape of any pressure at this point while permitting relatively free motion of the cable therethrough to allow adjustment of said cable. The projecting end of the cable passes over the external roller 30 and is then wound about the rotatable reel 32. Said reel is mounted for rotation with respect to the support disk 33 and is movable to various adjusted positions in which it may be latched by the spring pressed latch pawl 36. When the reel is locked in a particular position, the cable merely passes through the float support arm 20, over the pulley 27 and connects with the float element 15 to locate the float element at a desired elevation.

Any subsequent movement of the float support arm 20 does not affect the cable adjustment because the cable in effect becomes a part of said arm and moves therewith in an upward or downward direction. That portion of the cable between the gland 29 and pulley 27 is co-extensive with the arm 20 and any movement of the arm 20 swinging on its pivot arm is followed by that portion of the cable within said arm. There is no rotation of the pulley during such motion and therefore, for all practical purposes, the float element 15 is directly suspended from the outer end of the float support arm 20.

It is preferable to locate the float element 15 with its central portion at substantially the elevation L at which the interference is to be maintained. If such interface rises, this results in a reduction in the effective weight of float 15 which changes the torque applied to the pivotal mounting of the arm 20. This torque change is reflected in a tendency to move the bracket arm 49 which is clamped to the projecting end 24b of the pivot shaft 24 in a direction which allows the actuator bar to swing in a direction lifting the upper valve 63 of the pilot control unit C from its seat. As explained, this conducts pilot pressure into conductor 40 and directs it to the pressure-responsive means of the water discharge valve 12 to further open said valve and permit the escape of additional water from the vessel 10 whereby the interface level is brought downwardly back to the control point.

If the interface level L falls, the effective weight of the float 15 is increased and a reverse action on the pilot control unit C results so that the upper valve seats and the lower valve 65 of said control unit unseats to vent some pressure from conductor 40. Venting of pressure from said conductor results in moving the discharge valve 12 toward its closed position to reduce the discharge of water from the vessel and this action continues until the interface level is brought back to the proper desired point.

In many instances it is desirable, in accordance with particular conditions encountered, to change the level at which the interface is to be maintained. The range within which such a change might be necessary can be as much as 15 to 20 feet and with the present device the position of the float 15 may be quickly and easily varied to change the control point of the level of the interface. The adjustment or change in position of the float element 15 is accomplished from exteriorly of the vessel by merely disengaging the latch 37 and rotating the reel 32 in the proper direction. Due to the particular suspension of the cable 19 from the end of the float support tube 20, there is no change in the manner in which the float is suspended and no change in the manner in which the float element 15 controls the actuation of the pilot control unit. The float element may be adjusted to any elevation within the entire length of the pipe or chamber 16 and if the float element is mounted within the vessel 10, it may be positioned at any desired elevation within such vessel. Therefore, a structure is provided which permits a very wide range of adjustment of the position of the float element 15 and the interface level L may be carried at any elevation which may be desirable in accordance with operating conditions. The provision of the pulleys or rollers 27 and 30 reduces any friction and although found to be satisfactory, such pulleys are not absolutely essential to the invention.

Although it is preferable that the cable pass through the tubular support arm 20 in the manner shown, it is evident that said cable, after passing around a point on the outer end of the arm 20 could be arranged in any suitable way so that the effective length of the cable between the float and arm may be varied from exteriorly of the chamber in which the float is mounted. So long as the cable is combined with the float supporting and actuating mechanism in a manner that the vertical position of the float element 15 with respect to the outer end of the support arm may be changed from exteriorly of the vessel, the purposes of the invention will be accomplished.

The improved liquid level control device has been specifically described as controlling the interface between two liquids but as previously noted, it may be employed for controlling the liquid level of a liquid in a vessel or tank. In such case the operation would be the same and adjustment of the elevation of the float element over a very wide range would be possible.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A liquid level control device including, a housing, a tubular float support arm having one end pivotally mounted within said housing and its other end projecting into an area in which liquid level is to be controlled, a float element responsive to changes in liquid level and disposed in said area, a flexible line having one end attached to the float element and extending upwardly to and through the tubular float support arm, the opposite end of the line extending outwardly from the housing whereby it is accessible from the exterior of the area in which the float element is mounted, and means for attaching said outer end of said line to a fixed point, whereby the float element is suspended from the free end of the float support arm.

2. A liquid level control device as set forth in claim 1, together with packing means surrounding the line and located adjacent the point that said line exits from the housing for sealing off around said line.

3. A liquid level control device including, a housing, a tubular float support arm having one end pivotally mounted within said housing and its other end projecting into an area in which liquid level is to be controlled, a float element responsive to changes in liquid level and disposed in said area, a flexible line having one end attached to the float element and extending upwardly to and through the tubular float support arm, the opposite end of the line extending outwardly from the housing whereby it is accessible from the exterior of the area in which the float element is mounted, and line take-up means mounted exteriorly of the area in which the float is disposed, and means securing the outer end of said line to said take-up means whereby actuation of the take-up means controls the position of the float element relative to the float arm.

4. A liquid level control device as set forth in claim 3, together with packing means surrounding the line and located adjacent the point that said line exits from the housing for sealing off around said line.

5. A liquid level control device including, a horizontally disposed housing having one end of its interior in communication with an area in which liquid level is to be controlled, a tubular float support arm extending axially through said housing having one end pivotally mounted in the housing with its free end projecting into said area, a float element responsive to liquid level changes disposed within said area, a flexible cable having one end attached to the float and its opposite end passing over the free end of said float support arm, said cable also extending entirely through the tubular support arm and also outwardly through the housing, and means for attaching that end of the cable which extends outside said housing to a point exteriorly of the housing, whereby said float element is suspended from the support arm, whereby changes in liquid level to which the float element is responsive will vary the torque applied to said support arm by said float element.

6. A liquid level control device, as set forth in claim 5, together with a packing means mounted in the housing at the point of exit of said cable for sealing off around said cable.

7. A liquid level control device including, a horizontally-disposed housing having one end of its interior in communication with an area in which liquid level is to be controlled, a tubular float support arm extending axially through said housing having one end pivotally mounted in the housing with its free end projecting into said area, a float element responsive to liquid level changes disposed within said area, a flexible cable having one end attached to the float and its opposite end passing over the free end of said float support arm, said cable also extending entirely through the tubular support arm and also outwardly through the housing, a rotatable reel mounted exteriorly of the housing, and means for attaching the exterior end of the cable to said reel whereby rotation of the reel will wind or unwind said cable thereon to thereby vary the elevation of the float element with respect to the float support arm.

8. A liquid level control device as set forth in claim 7, together with means for latching said reel in various adjusted positions.

9. A liquid level control device including, a horizontally disposed housing having one end of its interior in communication with an area in which liquid level is to be controlled, a tubular float support arm extending axially through said housing having one end pivotally mounted in the housing with its free end projecting into said area, a float element responsive to liquid level changes disposed within said area, a flexible cable having one end attached to the float and its opposite end passing over the free end of said float support arm, said cable also extending entirely through the tubular support arm and also outwardly through the housing, means for attaching that end of the cable which extends outside said housing to a point exteriorly of the housing whereby said float element is, in effect, suspended from the free end of the support arm and applies a torque to the pivotal mounting at the other end of said arm, means co-acting with the support arm mounting for balancing the torque applied thereto by the effective weight of the float element, whereby subsequent changes in the effective weight of the float element which represent variations in liquid level acting upon said float element are reflected in an unbalance of the support arm mounting system, and means responsive to the unbalance in said support arm mounting for sensing the unbalance occurring in the system.

10. A liquid level control device as set forth in claim 9, wherein the means for sensing the unbalance in the support arm system comprises a pilot pressure control unit having means for increasing or decreasing the pilot pressure in a conductor, whereby the pressure in said conductor is representative of changes in liquid level as indicated by the float element.

11. A liquid level control device as set forth in claim 9, wherein the means for sensing the unbalance in the support arm system comprises a pilot pressure control unit having means for increasing or decreasing the pilot pressure in a conductor, whereby the pressure in said conductor is representative of changes in liquid level as indicated by the float element, and also wherein the means for attaching said cable to a point exteriorly of the housing comprises a rotatable reel to which the outer free end of the cable is attached, whereby rotation of the reel winds or unwinds the cable to change the elevation of the float element with respect to the support arm, and means for releasably latching said reel in various adjusted positions.

12. A liquid level control device as set forth in claim 9, wherein the means for sensing the unbalance in the support arm system comprises a pilot pressure control unit having means for increasing or decreasing the pilot pressure in a conductor, whereby the pressure in said conductor is representative of changes in liquid level as indicated by the float element, a discharge line communicating with the lower portion of the area in which the liquid level is being controlled, a pressure-actuated valve in said discharge line for controlling the volume of liquid being discharged, and means for utilizing the controlled pilot pressure in the conductor for controlling the operation of said valve.

13. A liquid level control device including, a horizontally-disposed housing having one end in communication with an area in which the interface level between two immiscible liquids having differing densities is to be controlled, a tubular float support arm extending axially within the housing having one end pivotally mounted in the housing and its free end projecting into said area, a displacement type float element, a flexible cable which is substantially co-extensive with the float arm and passing substantially through the pivot point of the float arm and which has contact with the free end of the arm and depends therefrom for suspending said float element in a position below the free end of said support arm, said float being so located with respect to the interface between said liquids that said interface is substantially midway between the top and bottom of said float, the effective weight of said float element which varies in accordance with rise and fall of the interface level acting upon the support arm to apply a torque to the pivotal mounting system of said support arm, means for sensing the torque in the support arm system, a pilot control unit actuated by said sensing means, and means operable from exteriorly of the area in which said float element is disposed for taking up or paying out the flexible cable to which the float element is attached to thereby change the position of the float element relative to the free end of the support arm, whereby proper control of the interface level at any desired elevation may be accomplished.

14. The combination with a vessel containing two immiscible liquids which are subject to their densities differing at various times, of a liquid level device including, a vertical pipe section having its upper and lower ends closed, means communicating the upper portion of said pipe section with the vessel at a point below the level of the upper liquid therein, means communicating the lower portion of said pipe section with the vessel at a point below the level of the lower liquid therein whereby the liquids in said vessel are present in said pipe section, a horizontal housing having one end of its interior communicating with the pipe section above the point of communication between said section and the upper liquid, a float support arm having one end pivotally mounted within the housing and its other end disposed in the upper end of the pipe section, a float element within said pipe section, flexible means extending through said float support arm and having one end attached to the float element for suspending said float element from the free end of said support arm, said means being substantially co-extensive with said float support arm and passing substantially through the pivot point of the float support arm, the opposite end of said suspending means being accessible from the exterior of the horizontal housing and means co-acting with that portion of the suspending means which is accessible from the exterior of the housing for adjusting the vertical position of said float element relative to said support arm.

15. A liquid level control device including, a horizontally disposed housing having one end of its interior in communication with an area in which liquid level is to be controlled, a tubular float support arm extending axially through said housing having one end pivotally mounted in the housing with its free end projecting into said area, a float element responsive to liquid level changes disposed within said area, a flexible cable having one end attached to the float and its opposite end passing over the free end of said float support arm, said cable being substantially co-extensive with the tubular support arm and passing substantially through the pivot point of the float arm and having its opposite end extending outwardly through the housing, means for attaching that end of the cable which extends outside said housing to a point exteriorly of the housing whereby said float element is, in effect, suspended from the free end of the support arm and applies a torque to the pivotal mounting at the other end of said arm, means co-acting with the support arm mounting for balancing the torque applied thereto by the effective weight of the float element, whereby subsequent changes in the effective weight of the float element which represent variations in liquid level acting upon said float element are reflected in an unbalance of the support arm mounting system, means responsive to the unbalance in said support arm system for sensing the unbalance occurring in said system, and means located exteriorly of the housing for adjusting the balancing means to assure sensitive operation.

References Cited in the file of this patent

UNITED STATES PATENTS

| | | |
|---|---|---|
| 1,078,783 | Grimm | Nov. 18, 1913 |
| 1,302,350 | Foster | Apr. 29, 1919 |
| 2,023,073 | Harman | Dec. 3, 1935 |
| 2,653,623 | Hippen | Sept. 29, 1953 |
| 2,834,217 | Bauer | May 13, 1958 |
| 2,984,360 | Smith | May 16, 1961 |

FOREIGN PATENTS

| | | |
|---|---|---|
| 257,653 | Great Britain | Aug. 30, 1926 |